Figure 1:
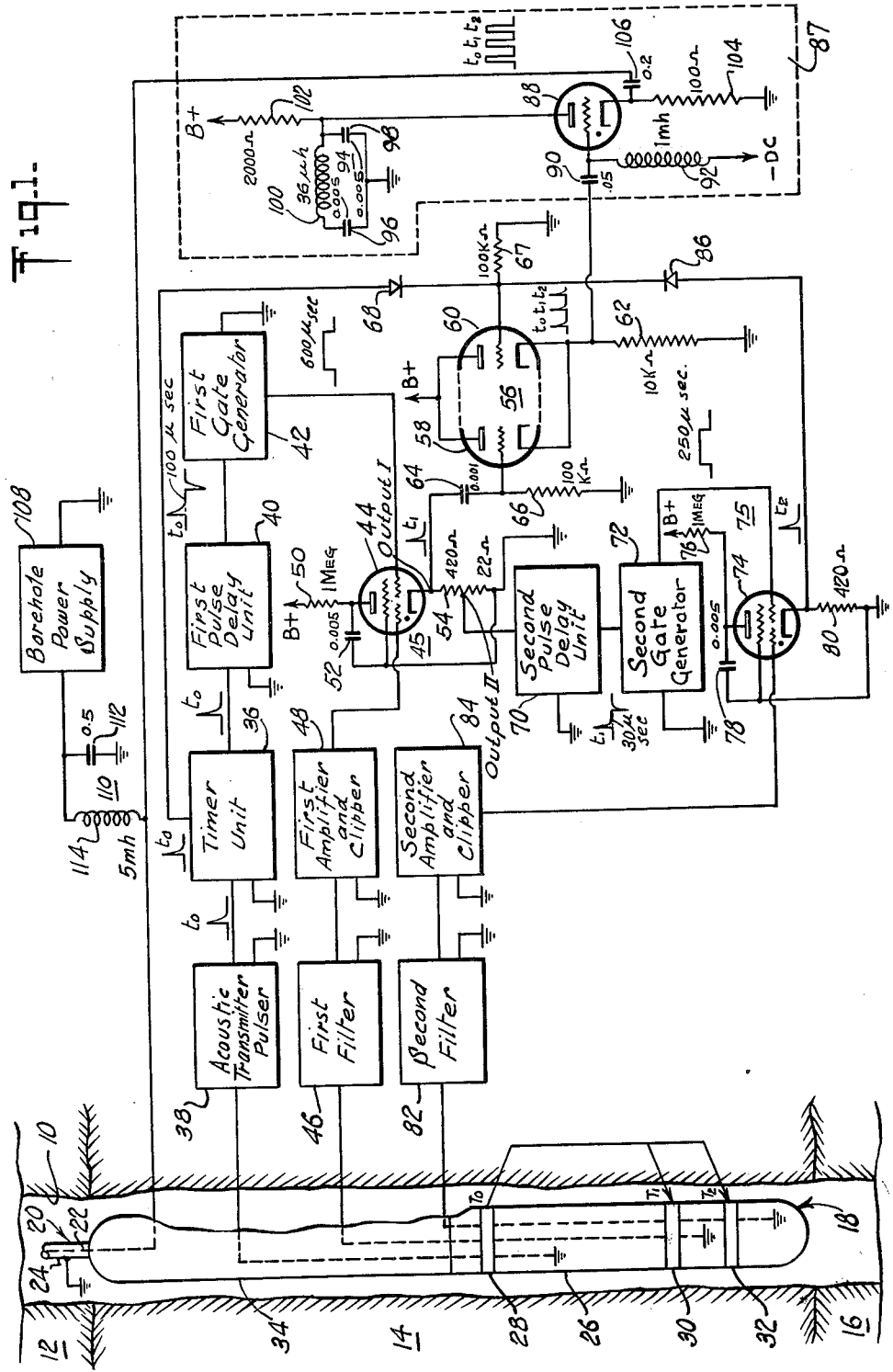

Jan. 1, 1963
K. D. SAVAGE ETAL
ACOUSTICAL VELOCITY WELL LOGGING
Filed Sept. 28, 1959
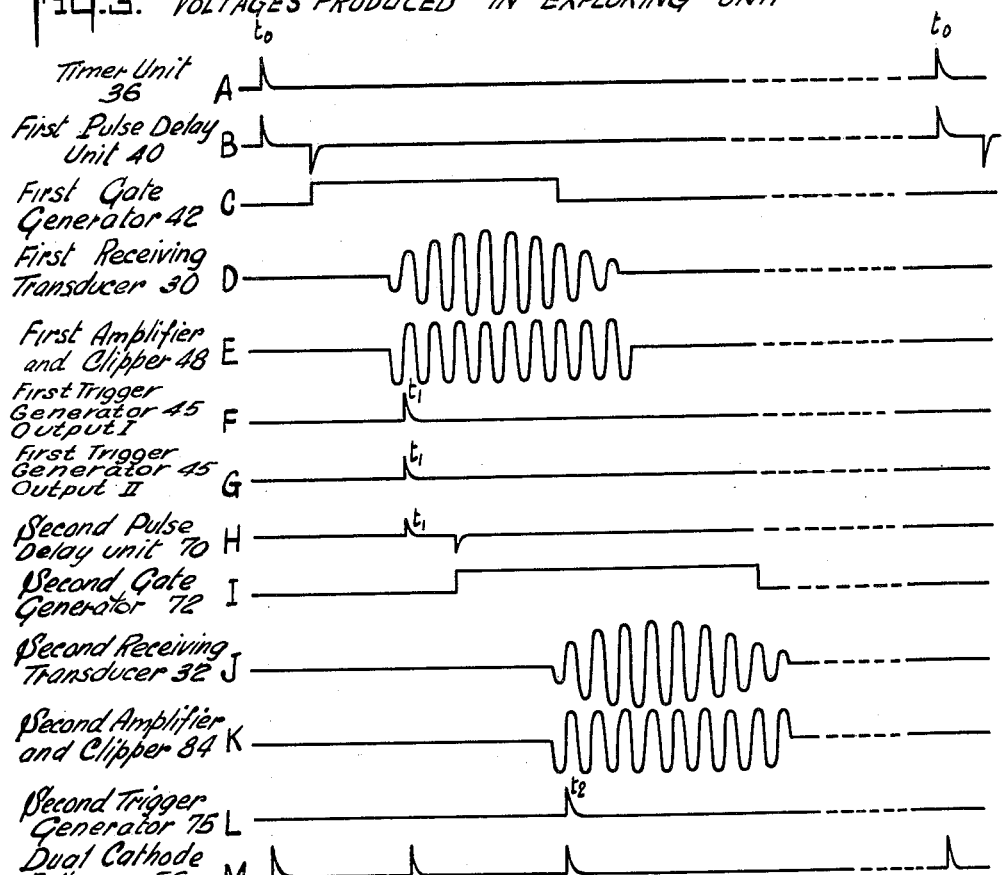
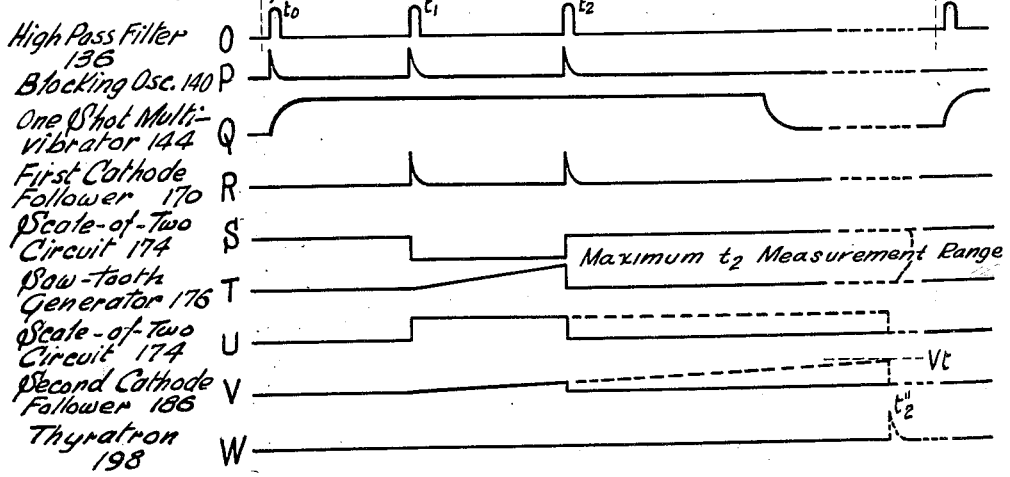
Fig. 3.

() # United States Patent Office 3,071,203
Patented Jan. 1, 1963

3,071,203
ACOUSTICAL VELOCITY WELL LOGGING
Kerry D. Savage and Lloyd E. Elliott, Jr., Houston, Tex., assignors to Texaco Inc., New York, N.Y., a corporation of Delaware
Filed Sept. 28, 1959, Ser. No. 842,929
10 Claims. (Cl. 181—.5)

This invention relates to the determination of the nature of subsurface strata, and, more particularly, to a determination of the acoustical properties of subsurface strata which has been traversed by a borehole.

In acoustical velocity well logging as it is generally practiced today, the velocity of an ultrasonic wave through the various subsurface formations is determined by producing an acoustic pulse at a repetition rate of about 20 times a second, however, repetition rates of from 10 to 40 times a second have been found acceptable, and determining the lapse of time of one of the acoustic pulses travelling through the subsurface formation between two spaced apart points in the borehole.

In the prior art acoustical velocity logging systems, a separate electrical channel has been provided between the first point of the two spaced apart points and an elapsed time measuring circuit and a separate electrical channel has been provided between the second point and the measuring circuit. In some instances, the two electrical channels coupled to the measuring circuit have been terminated in the borehole, for example, as disclosed in U.S. Patent 2,931,455, granted April 5, 1960, as a result of the copending U.S. patent application of R. H. Loofbourrow having Serial No. 574,844 and entitled Acoustic Logging of Wells, and in other instances the channels have been extended up through the borehole via a multiconductor cable to the measuring circuit disposed at the surface of the earth. In addition to providing at least two electrical channels for applying signals from the two spaced apart points to the measuring circuit, another channel has been provided for applying an electric pulse to a transmitting transducer to produce the acoustic pulses in the borehole and an additional channel has been provided to energize the downhole or exploring unit electronic equipment, thus necessitating the use of at least a four conductor cable. In the instances where the channels between the two spaced apart points and the measuring circuit of acoustical systems have been confined entirely within an exploring unit or tool located in the borehole, it has been found that it is difficult, if not impossible, to properly calibrate these systems. These latter systems transmit an electrical signal through the borehole which is intended to be an indication of the velocity of the subsurface formation adjacent the exploring unit but this signal has been found to be dependent upon unknown conditions in the unfriendly environment of the borehole.

I accordance with the present invention, an acoustic velocity well logging system is provided wherein an electric pulse at each of three transducers supported in an exploring unit is transmitted through a single conductor cable to the earth's surface where the pulses are detected and then one of the three pulses is deleted and the elapsed time between the remaining two pulses is measured.

Figure 2:
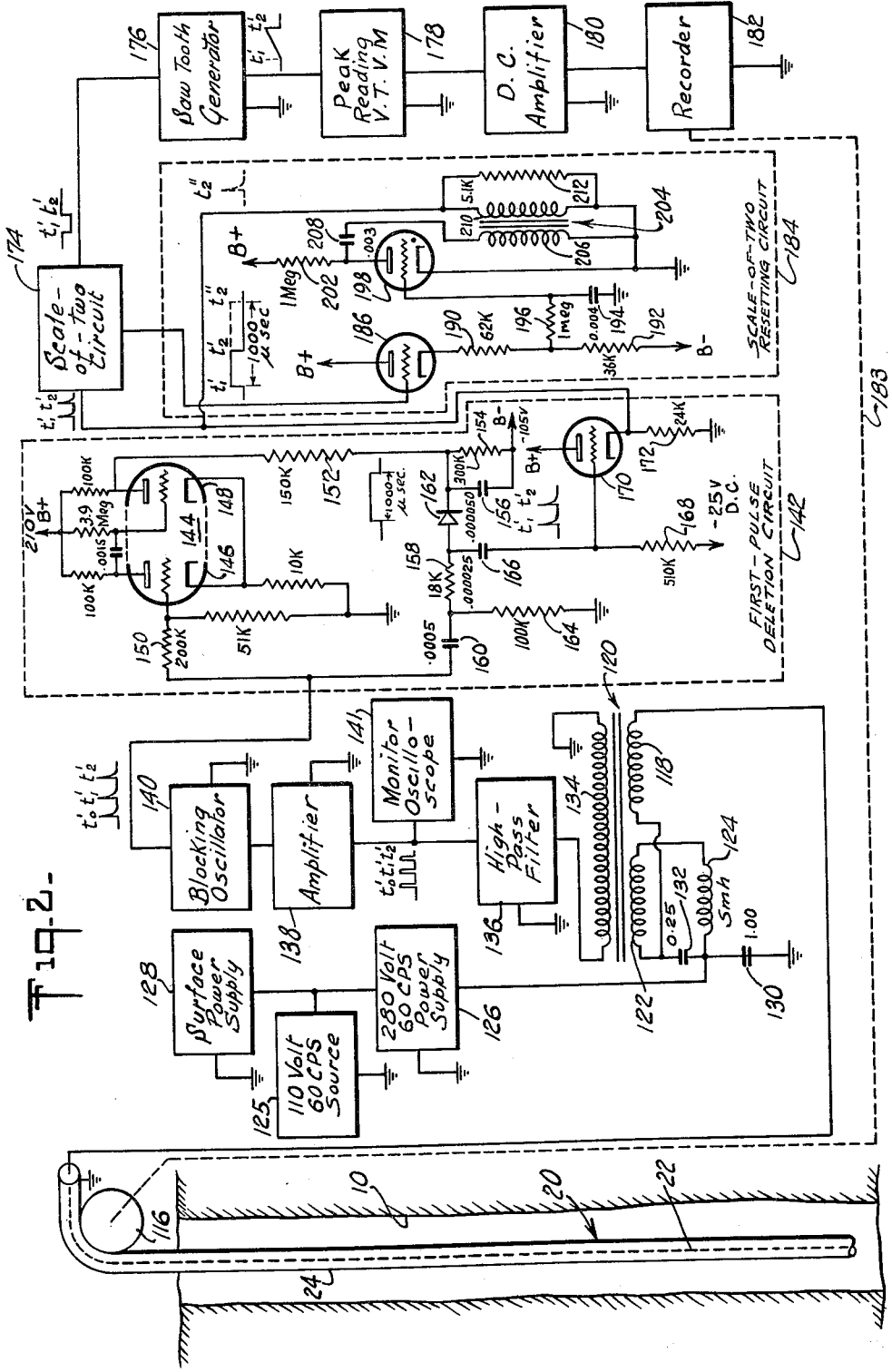

For a better understanding of the invention, reference may be had to the accompanying drawing in which FIG. 1 is a circuit diagram partly in block form illustrating the borehole equipment in accordance with the present invention wherein part of the apparatus is shown in a borehole in the earth, the earth being shown in section, FIG. 2 is a circuit diagram partly in block form illustrating the surface equipment of the system of the present invention wherein part of the apparatus is shown in a borehole in the earth, the earth being shown in section, and FIG. 3 is a time sequence diagram of the voltages developed in the system of the present invention.

Referring in more detail to FIG. 1 of the drawing, a borehole 10 containing a borehole liquid, which may be any conventionally used borehole drilling mud, is shown traversing a plurality of subsurface formations 12, 14, and 16, in which formations it is desired to determine the acoustical velocity. Disposed within the borehole is an exploring unit or elongated tool 18 supported by a conventional 5/16" single insulated conductor borehole cable 20. The single conductor cable 20 includes a central conductor 22 generally composed of copper, or other highly conductive metal, and an outer sheath 24 made of steel strands having a strength sufficient to support the exploring unit 18 and its own weight in the borehole. The exploring unit 18 has an acoustical section 26 at the lower end thereof in which an acoustical pulse transmitting transducer 28, a first acoustic pulse receiving transducer 30 and a second acoustic pulse receiving transducer 32 are contained. The transmitting transducer 28 and the first receiving transducer 30 are spaced apart a distance of, preferably, three feet, and the first and second receiving transducers are spaced apart a distance of, preferably, one foot. Each of the transducers is preferably of the lead zirconate titanate type or of the barium titanate type. The walls and the interior of the acoustical section 26 of the exploring unit 18 are made of a material in which velocity of sound is not greater than the velocity of sound passing through the fluid in the borehole 10, preferably, a material in which velocities are less than 5,000 feet per second and which can withstand the high temperatures and pressures encountered in a borehole, for example, a rubber-like material such as Neoprene. The upper portion of the exploring unit 18 is an electronic section 34 wherein the exploring unit electronic components are housed.

The electronic section 34 houses a timer unit 36 which may be any desirable oscillator producing pulses, preferably, at a constant repetition rate or frequency, for example, at 20 pulses per second. An acoustic transmitter pulser 38, which may be a conventional circuit for producing a sharp high-energy electric pulse, is coupled to the output of the timer unit 36 and is connected at its output to the transmitting transducer 28. Also connected to the output of the timer unit 36 is a first pulse delay unit 40 which may comprise a one-shot multivibrator and a differentiator. A first gate generator 42, which may be a one-shot multivibrator, producing a positive square wave at its output is connected to the output of the first delay pulse unit 40. The first gate generator 42 is connected at its output to a grid of a first dual control coincidence thyratron 44 of a first trigger generator 45.

The first receiving transducer 30 of the acoustical section 26 of the exploring unit 18 is coupled to a first high-pass filter 46 which preferably has a cut-off frequency of approximately 5 kilocycles. A conventional first amplifier and clipper 48 is connected to the output of the first filter 46. The output from the first amplifier and clipper 48 is applied to another grid of the dual control coincidence thyratron 44.

The anode of the thyratron 44 is connected to a B+ supply of energy through a charge resistor 50 having a high resistance value. A storage capacitor 52 is connected between the anode of the thyratron 44 and ground. The shield grid of thyratron 44 is also connected to ground. A cathode resistor 54 is connected between the cathode of thyratron 44 and ground. A dual cathode follower 56 having a first triode section 58 and a second triode section 60 has a common cathode resistor 62. The control grid of the first triode section 58 is connected to output I of the first trigger generator 45 which is the cathode of thyratron 44 through a first coupling capacitor 64. The control grid of the first triode section 58 is connected to ground through a resistor 66. The control grid of the second triode section 60 is connected to the output of the timer unit 36 through a blocking diode 68, preferably a 1N 646. A resistor 67 is connected between the control grid of the second triode section 60 and ground.

A second pulse delay unit 70 which also may include a one-shot multivibrator and a differentiator is connected to output II of the first trigger generator 45 which is a tap on the cathode resistor 54 of the thyratron 44. The output of the second pulse delay unit 70 is coupled to a second gate generator 72 which may also comprise a one-shot multivibrator. The output of the second gate generator 72 is coupled to a first control grid of a second dual control coincidence thyratron 74 of a second trigger generator 75. A high resistor 76 is connected between the anode of the second thyratron 74 and the B+ supply. A capacitor 78 is connected between the anode of the second thyratron 74 and ground. The shield grid of the second thyratron 74 is also connected to ground. A cathode resistor 80 is connected between the cathode of the second thyratron and ground.

Coupled to the output of the second receiving transducer 32 is a second filter 82 which is also preferably a high-pass filter having a cutoff frequency at approximately 5 kilocycles. A conventional second amplifier and clipper 84 is connected to the output of the second filter 82. The output of the second amplifier and clipper 84 is connected to a second control grid of the dual control coincidence thyratron 74. The cathode of the second thyratron 74 is connected to the control grid of the second triode section 60 of the dual cathode follower 56 through a second blocking diode 86.

The cathodes of the dual cathode follower 56 are connected to a cable pulsing circuit 87 and, more particularly, to the control grid of a hydrogen thyratron 88 of the cable pulsing circuit 87 through a coupling capacitor 90. The control grid of the hydrogen thyratron 88 is also connected to a negative direct current potential through a choke 92. An energy storing or pulse forming network 94, which includes first and second capacitors 96 and 98 and a coil 100, is connected at one terminal to ground and at the other terminal directly to the anode of the hydrogen thyratron 88 and through a resistor 102 to the B+ supply. The energy storing network 94 may conveniently be a predetermined length of coaxial cable. A cathode resistor 104 having a low ohmic value is connected between the cathode of the hydrogen thyratron 88 and ground. A coupling capacitor 106 is connected between the cathode of the hydrogen thyratron 88 and the single conductor cable 20. A borehole power supply 108 is connected to the single conductor 22 of the single conductor cable 20 through a filter network 110, which includes a capacitor 112 connected between the input of the borehole power supply 108 and ground and an inductor 114 which is connected between the input of the borehole power supply 108 and the single conductor 22 of the single conductor cable 20.

The surface equipment of the acoustical velocity well logging system of the present invention is illustrated in FIG. 2. As shown in this figure, the single conductor cable 20 passes over a cable measuring device 116. The upper or surface end of the single conductor 22 of the single conductor cable 20 is connected to a first primary winding 118 of a step-up transformer 120, the sheath 24 of the cable 20 being connected to ground. A second primary winding 122 of the transformer 120 is serially conducted with the first primary winding 118 and also with an inductor 124 to the output of a power supply 126 which is, essentially, a variable step-up transformer increasing the 110 volts, 60 c.p.s. of a power source 125 to approximately 280 volts, 60 c.p.s. A surface power supply 128 is also connected to the output of the 110 volts, 60 c.p.s., power source 125. A first capacitor 130 is connected between the output of the power supply 126 and ground. A second capacitor 132 is connected between the output of the power supply 126 and the common point between the first and second primary windings 118, 122 of the transformer 120. A secondary winding 134 of the transformer 120 is connected to a high-pass filter 136. The output from the high-pass filter 136 is connected to a conventional amplifier 138 which has its output connected to a blocking oscillator 140. A pulse detecting device such as a monitor oscilloscope 141 is connected to the output of the high-pass filter 136.

The output of the blocking oscillator 140 is connected to a first-pulse deletion circuit 142. The first pulse deletion circuit 142 comprises a conventional one-shot multivibrator 144 having a first triode 146 and a second triode 148. More specifically, the output from the blocking oscillator 140 is connected to the control grid of the first triode 146 through a coupling resistor 150. The anode of the second triode 148 of the one-shot multivibrator 144 is connected through a first resistor 152 connected in series with the parallel combination of a second resistor 154 and a shunt capacitor 156 to a B— supply. A first load resistor 158 is also connected to the output of the blocking oscillator 140 through a first coupling capacitor 160. A silicon diode 162, which is preferably a 1N 646, is connected between the first load resistor 158 and the common point between the first resistor 152 and the second resistor 154. A second load resistor 164 is connected between the common point of the first coupling capacitor 160 and the first load resistor 158, and ground. A second coupling capacitor 166 is connected between the common point of the first load resistor 158 and the silicon diode 162 and a grid resistor 168. The grid resistor 168 is connected between the control grid of a cathode follower 170 and a negative direct current potential or bias source. The anode of the cathode follower 170 is connected directly to the B+ supply and the cathode of the cathode follower 170 is connected through a load resistor 172 to ground.

The cathode of the cathode follower 170 is connected to a scale-of-two circuit 174 which is in turn connected to a sawtooth generator 176, the scale-of-two circuit being preferably, of the type described in Electronics, by Elmore and Sands, page 111, published by McGraw-Hill first edition. A peak reading vacuum tube voltmeter 178 is connected to the output of the sawtooth generator 176. A direct current voltage amplifier 180 couples the peak reading vacuum tube voltmeter 178 to a recorder 182. The recorder 182 may include any conventional recording medium, such as a chart, film strip or magentic tape. Coupling means 183 are provided between the cable measuring device 116 and the recorder 182 so as to record at a speed which is a function of the speed of the logging cable 20.

An output from the scale-of-two circuit 174 is also connected to a scale-of-two resetting circuit 184. The scale-of-two resetting circuit 184 comprises a cathode follower 186 having its control grid connected to an output of the scale-of-two circuit 174, its anode connected directly to the B+ supply and its cathode connected to a B— supply through a series combination of a first cathode resistor 190 and a second cathode resistor 192. A first capacitor 194 is connected at one terminal to ground and at the other terminal to the common point between the first and second cathode resistors 190, 192 through a first resistor 196 having a high resistance value. The common point between the first capacitor 194 and the high resistor 196 is connected to a control grid of a thyratron 198. A second resistor 202, also having a high resistance value, is connected between the anode of the thyratron 198 and the B+ supply. An output transformer 204 has a primary winding 206 which is connected at one terminal to ground and at the other terminal to the anode of the thyratron 198 through a second capacitor 208. The secondary winding 210 of the output transformer 204 has one terminal connected to ground and the other terminal connected to the input of the scale-of-two circuit 174. A damping resistor 212 is connected across the secondary winding 210 of the transformer 204.

FIG. 3 is a time sequence diagram illustrating the voltages produced at the output of the portion of the exploring unit and of the surface equipment indicated therein so as to facilitate the understanding of the operation of the acoustical velocity well logging system of the present invention.

In operation, an electric pulse $t_0$ produced by the timer unit 36 is applied to the acoustic transmitter pulser 38 which produces a sharp high-energy electrical pulse for actuating the transmitting transducer 28 to generate an acoustic pulse $T_0$. In practice the transmitting tranducer 28 generates an acoustic wave train rather than a single acoustic pulse since mechanical oscillations are produced in the transmitting transducer 28 each time an electric pulse $t_0$ from the acoustic transmitter pulser 38 is applied thereto. When the acoustic wave train arrives at one of the receiving transducers 30, 32, the receiving transducer produces a corresponding electrical wave train at its output. Since only the first wave of the electrical wave train is used to measure the travel time of the acoustic energy between the two receiving transducers 30 and 32, as explained hereinafter, the operation of the system can be readily described by generally considering only the first acoustic wave or pulse $T_0$ of the acoustic wave train and only a first electric wave or pulse $t$ of the electric wave trains. The electric pulse $t_0$ from the timer unit 36 is simultaneously applied through the blocking diode 68 to the control grid of the second triode section 60 of the dual cathode follower 56, which acts as a pulse collecting circuit, to produce pulse $t_0$ across the cathode resistor 62 of the dual cathode follower 56. The electric pulse $t_0$ from the timer unit 36 is also simultaneously applied to the first pulse delay unit 40 which produces a negative pulse approximately 100 microseconds after the electric pulse $t_0$ is applied thereto, the 100 microseconds being just less than the expected minimum travel time of acoustic energy from the transmitting transducer 28 to the first receiving transducer 30 for the three foot transducer spacing therebetween. The negative pulse actuates the first gate generator 42 to produce a positive square wave having a duration of approximately 600 microseconds which is applied to one of the control grids of the dual control coincidence thyratron 44 of the trigger generator 43, this 600 microsecond positive wave or pulse being produced at a time interval which is at least between the earliest expected pulse and the latest expected pulse at the first receiving transducer 30.

The acoustic pulse $T_0$ produced at the transmitting transducer 28 travels through the borehole fluid into the subsurface formation 14 where a portion of it is refracted through the formation 14 toward the first and second receiving transducers 30 and 32. A portion of the refracted acoustic pulse reenters the borehole fluid to strike the first receiving transducer 30 and at a later time depending upon the acoustical properties of the formation 14 another portion of the refracted pulse reenters the borehole fluid to strike the second receiving transducer 32. The voltage developed by the first receiving transducer 30 corresponding to the acoustic energy received thereat is applied to the first amplifier and clipper 48 through the first filter 46. The first positive going wave from the output of the first amplifier and clipper 48 is applied to the other of the control grids of the dual control coincidence thyratron 44 of the trigger generator 45 to fire or ionize the thyratron 44. As soon as the thyratron 44 is fired the energy stored in the storage capacitor 52 produces a positive electric pulse $t_1$ across the cathode resistor 54. Since the charge resistor 50 of the first trigger generator 45 has a high resistance value, the storage capacitor 52 cannot be immediately recharged and, therefore, the subsequent positive waves of the wave train from the first receiving transducer 30 will not again fire the thyratron 44. The impedance values of the charge resistor 50 and the storage capacitor 52 are such that the thyratron 44 will be in condition to fire upon the arrival of the next electric wave train initiated by an acoustic pulse $T_0$. The output signal derived from output I of the first trigger generator 45 comprising the entire voltage or pulse $t_1$ produced across cathode resistor 54 and is applied to the control grid of the first triode section 58 of the dual cathode follower 56 through a coupling capacitor 64 so as to develop the pulse $t_1$ across the cathode resistor 62 of the dual cathode follower 56.

A portion of the voltage or pulse $t_1$ developed across the cathode resistor 54 in the first trigger generator 45 is derived from output II thereof comprising a tap on the cathode resistor 54 and is applied to the input of the second pulse delay unit 70. A negative pulse $t_D$ is produced at the output of the second pulse delay unit 70 approximately 30 microseconds after the pulse $t_1$ is applied thereto, 30 microseconds being just less than the expected minimum travel time of acoustic energy from the first to the second receiving transducers for the one foot spacing therebetween. The negative pulse $t_D$ from the second pulse delay unit 70 initiates a positive square wave having a duration of approximately 250 microseconds at the output of the second generator 72. The 250 microsecond positive pulse, which is produced at a time interval which is at least between the occurrence of the earliest expected pulse and the latest expected pulse at the second receiving transducer 32, is applied to a control grid of the dual control coincidence thyratron 74 of the second trigger generator 75.

The voltage wave developed across the second receiving transducer 32 corresponding to the acoustic energy received thereat is applied to the second amplifier and clipper 84 through the second filter 82. The first positive going wave from the output of the second amplifier and clipper 84 is applied to the other control grid of the dual control coincidence thyratron 74 of the second trigger generator 75 to fire the thyratron 74. The energy stored in the storage capacitor 78 is then discharged through the thyratron 74 to produce a pulse $t_2$ across the cathode resistor 80 of the second dual control coincidence thyratron 74. As explained in connection with the first trigger generator 45, the subsequent positive going waves of the wave train will not again fire the thyratron 74. The pulse $t_2$ is applied through the second blocking diode 86 to the control grid of the second triode section 60 of the dual cathode follower 56 to produce the pulse $t_2$ across the cathode resistor 62 of the dual cathode follower 56. The three pulses $t_0$, $t_1$ and $t_2$ produced across the cathode resistor 62 of the dual cathode follower 56 are applied to the control grid of the hydrogen thyratron 88 of the cable pulsing circuit 87 through the coupling capacitor 90. As the pulse $t_0$ fires the hydrogen thyratron 88, the energy stored in the storage network 94 is discharged through the hydrogen thyratron 88 to produce a high-amplitude short-duration pulse across the low cathode resistor 104 of the hydrogen thyratron 88. As the energy from the storage network 94 is discharged, the hydrogen thyratron 88 will extinguish and then the storage network 94 will be rapidly recharged by the energy from the B+ supply through the charging resistor 102 so as to await the arrival of the pulse $t_1$. The choke 92 and the negative direct current voltage applied through the choke to the control grid of the hydrogen thyratron 88 are provided so as to rapidly deionize the thyratron 88. The cable pulsing circuit 87 operates similarly upon the receipt of the pulse $t_1$ and again upon the receipt of the pulse $t_2$. Consequently, the three high-power short-duration pulses $t_0$, $t_1$ and $t_2$ are produced at the cathode of the hydrogen thyratron 88.

These pulses $t_0$, $t_1$ and $t_2$ are then applied to the single conductor 22 of the single conductor cable 20 through the coupling capacitor 106 for transmission to the earth's surface.

Since the cable 20 may be of great length, for example, 20,000 feet or even longer, and since the diameter of the cable 20, which must support itself as well as the exploring unit 18, may be as small as 5/16 of an inch, it can be readily seen that the cable is very lossy, and is of very low impedance. The cable 20 acts essentially as a low-pass filter. In the frequency range of the pulses $t_0$, $t_1$ and $t_2$ used in the system, the lumped shunt impedance of the cable is in the order of one ohm while the lumped series impedance is at least seventy ohms. To obtain maximum power transfer through the cable 20 proper impedance matching must be carefully considered. It has been found with a presently used cable that a 100 ohm grounded cathode resistor connected to the hydrogen thyratron 88 and coupled to the coaxial cable 20 through a 0.2 microfarad capacitor will provide a relatively sharp and satisfactory pulse at the earth's surface. The 0.2 microfarad capacitor blocks the 60 cycle voltage from the cable and the 100 ohm resistor allows a discharge path for the capacitor.

It should be understood that the B+ supply, the negative direct current or bias voltage and the filament voltage for the circuits contained in the borehole unit 18 are all derived from the borehole power supply 108 which is illustrated merely in block form since it may be of the conventional type and which would unduly complicate the drawing if illustrated in detail. The borehole power supply 108 is energized by the 60 cycle per second power supply 126 located at the surface of the earth and transmitted to the exploring unit 18 through the single conductor cable 20. The 60 cycle energy is fed from the cable 20 to the borehole power supply 108 through the inductor 114. The inductor 114 and the capacitor 112 are provided to prevent the pulses $t_0$, $t_1$ and $t_2$ from entering into the borehole power supply 108. The voltage of the 60 cycle power supply 126 is, preferably, 280 volts so as to provide 240 volts at the input of the borehole power supply 108, since it has been found that a 40 volt drop exists in the cable 20. However, as understood by those skilled in the art, this voltage may be varied depending upon the circuits or elements used in the acoustic well logging system. The surface power supply 128, which is energized by the 60 cycle per second, 110 volt power source 125, supplies the B+, B—, negative direct current or bias voltage and filament voltage to the surface equipment. Since the surface power supply may also be a conventional power supply, details thereof have not been disclosed. With the elements of the system illustrated having the values indicated in the drawing, the B+ voltage was 210 volts, the B— voltage was —105 volts and the negative direct current or bias voltage in the exploring unit was —15 volts, and the negative direct current or bias voltage in the surface unit was —25 volts. It should be understood the units of the capacitance values of the capacitors illustrated in the drawing are microfarads.

The 60 cycle per second voltage from the power supply 126 is applied to the single conductor 22 of the single conductor cable 20 through the inductor 124, the second primary winding 122 and then the first primary winding 118 of the transformer 120. The first and second primary windings 118 and 122 are so wound that the flux changes due to 60 cycle current in one primary winding are cancelled by that in the other primary winding to produce a zero resultant 60 c.p.s. voltage in the secondary winding 134.

The three pulses $t_0$, $t_1$ and $t_2$ applied to the lower end of the single conductor cable 20 arrive at the upper end of the cable 20 displaced in time by an amount equal to the timed delay in transmission through the single conductor cable 20, which depends upon the transmission characteristics of the cable 20. Since the electric pulses received at the earth's surface are displaced in time they will be distinguished from the electric pulses $t_0$, $t_1$ and $t_2$ present in the exploring unit 18 by referring to the corresponding electric pulses at the earth's surface as pulses $t'_0$, $t'_1$ and $t'_2$.

The pulse transmission time delay may be in the order of 50 microseconds for an 18,000 to 20,000 foot cable. However, since each of the three pulses are transmitted by the same conductor in the cable 20 they are delayed by the same amount. Therefore, the time interval between the pulses $t_0$ and $t_1$ is the same as that between $t'_0$ and $t'_1$ and the time interval between $t_1$ and $t_2$ is the same as that between $t'_1$ and $t'_2$.

The three electric pulses $t'_0$, $t'_1$ and $t'_2$ received at the upper end of the single conductor cable 20 are applied to one terminal of the first primary winding 118 of the transformer 120 which is connected to ground at its other terminal by the capacitors 132 and 130 so as to prevent the pulses $t'_0$, $t'_1$, and $t'_2$ from passing through the second primary winding 122. Also, the inductor 124 is connected in series with the primary winding 122 to provide a high impedance to the pulses $t'_0$, $t'_1$ and $t'_2$ to further prevent them from passing through the second primary winding 122 of the transformer 120. The transformer 120 acts as a step-up transformer so as to provide electric pulses $t'_0$, $t'_1$ and $t'_2$ of sufficient amplitude after passing through the high-pass filter 136 and the amplifier 138 to actuate the blocking oscillator 140, which produces at the output thereof sharp pulses of equal amplitude. The three pulses $t'_0$, $t'_1$ and $t'_2$ from the blocking oscillator 140 are applied to the control grid of the first triode 146 of the one-shot multivibrator 144 through the coupling resistor 150. The first triode section 146 of the one-shot multivibrator 144 is normally in a non-conducting condition and the second triode section 148 of the one-shot multivibrator is normally in a conducting condition. When the first pulse of the three pulses, that is pulse $t'_0$, is applied to the grid of the first triode section 146, the first triode section is placed in a conducting condition and the second triode section then becomes non-conducting. Thus the voltage of the anode of the second triode section 148 begins to increase to form a positive-going wave. The time constant of the multivibrator 144 is such that the positive-going wave at the anode of the second triode section has a duration of approximately 1000 microseconds. The pulse $t'_0$ from the blocking oscillator 140 is also applied through the coupling capacitor 160 to the first load resistor 158 and through the normally conducting silicon diode 162, the shunt capacitor 156 and the B— supply to ground. The silicon diode 162 and the shunt capacitor 156 are very low impedance for the pulse $t'_0$ and, therefore, the voltage at the common point between the load resistor 158 and the silicon diode 162 is very small. The voltage at this common point is not sufficiently great to overcome the negative bias potential applied to the control grid of the first cathode follower 170 and to pass through the first cathode follower 170 to actuate the scale-of-two circuit 174. Accordingly, it can be seen that the pulse $t'_0$ does not pass into the acoustical velocity system's time measuring circuit which includes the scale-of-two circuit 174, the sawtooth generator 176, the peak reading vacuum tube voltmeter 178, the D.C. amplifier 180 and the recorder 182. By the time that pulse $t'_1$ from the blocking oscillator 140 is applied to the first load resistor 158, the silicon diode 162 has been rendered non-conductive by the positive-going wave from the second anode of the triode section 148 of the one shot multivibrator 144. Accordingly, pulse $t'_1$ and also pulse $t'_2$ will pass through the coupling capacitor 166 to the control grid of the cathode follower 170 to produce the pulses $t'_1$ and $t'_2$ across the cathode resistor 172 of the cathode follower 170. The second load resistor 164 is provided to complete the direct current for the silicon diode 162 while the diode is conducting. Of course, if the electric pulse $t_0$ is not transmitted to the earth's surface, the first pulse deletion circuit may be eliminated from the system of this invention.

The pulses $t'_1$ and $t'_2$ now being separated from pulse $t'_0$ can be applied to the elapsed time measuring circuit. The pulse $t'_1$ when applied to the scale-of-two circuit 174 initiates a negative wave or pulse at the output thereof which is terminated by the arrival of the pulse $t'_2$. Accordingly, it can be seen that the duration of the negative pulse is equal to the time of travel of the acoustic wave through the subsurface formation between the first and second receiving transducers 30 and 32. In order to conveniently measure the duration of the negative pulse from the scale-of-two circuit 174, the negative pulse is applied to the sawtooth generator 176, which produces a linearly increasing wave which continuously has a magnitude which is proportional to the time travel of an acoustic pulse from the first receiving transducer 30 to the second receiving transducer 32. Since the sawtooth generator 176 is sharply cut off at time $t'_2$, the peak value of the sawtooth voltage produced at the output of the generator 176 is proportional to the total time of travel of the acoustic pulse through the subrsurface formations between the first and second receiving transducers 30 and 32. The peak value of the sawtooth voltage from generator 176 is detected by the peak reading vacuum tube voltmeter 178 and applied to the recorder 182 through the direct current voltage amplifier 180 to provide a record of the acoustic velocity through a portion of a subsurface formation. Since the transmitting transducer 28 is producing acoustic pulses $T_0$ at a repetition rate of about 20 pulses per second, an accurate log of the acoustical velocities in substantially all subsurface formations traversed by a borehole may be obtained by moving the exploring unit 18 through the borehole.

Since the scale-of-two circuit 174 is a bi-stable circuit, it is necessary, in order to apply a pulse of the proper polarity to the sawtooth generator 176 to measure the desired time intervals, to supply an even number of pulses to the input of the scale-of-two circuit 174. It can be seen that if the pulse $t'_1$ initiates the negative going pulse from the output of the scale-of-two circuit 174 but the pulse $t'_2$ fails to arrive at the input of the scale-of-two circuit, the negative pulse will have a very long duration terminated only by the subsequent $t'_1$ pulse. Thus, when the subsequent $t'_2$ pulse arrives, a positive pulse will be produced having a duration equal to the time of travel of the acoustic pulse through the sub-surface formations between the first and second receiving transducers. The sawtooth generator 176 would, of course, be responsive to the long negative pulse rather than to the positive pulse which now is equal to the desired time interval. This condition would persist until an odd pulse would arrive to reset the scale-of-two circuit so as to provide an output pulse of the proper polarity.

Since a considerable length of time could pass before an odd pulse arrived at the scale-of-two circuit to reset it, the scale-of-two resetting circuit 184 is provided to supply an "artificial" pulse $t''_2$ at an instant of time shortly after the passage of a time interval during which a pulse $t'_2$ from the second transducer was expected but did not arrive at the scale-of-two circuit. In order to accomplish this result, a positive square wave or pulse initiated at the time $t'_1$ at another output of the scale-of-two circuit 174, is applied to the control grid of the second cathode follower 186. The voltage developed across the second of the two series connected cathode resistors 192 is applied to the capacitor 194 through the high resistor 196. The voltage across the capacitor 194 thus increases gradually as shown at V in FIG. 3 of the drawing. The trigger or firing voltage $V_t$ of the thyratron is set at a value which will be greater than the value of the voltage developed across the capacitor 194 during the time interval between pulses $t'_1$ and $t'_2$. However, if the pulse $t'_1$ or $t'_2$ does not arrive at the scale-of-two circuit 174, the voltage across the capacitor 174 will continue to increase until it reaches the trigger voltage $V_t$ of the thyratron 198. When this voltage $V_t$ is attained, the thyratron 198 will fire, discharging the energy stored in capacitor 208 through the primary winding 206 of the transformer 204 and, once fired, will extinguish due to the high resistance value of the second resistor 202. The secondary winding 210 will then apply the pulse $t''_2$ to the input of the scale-of-two circuit 174 to reset the circuit for the next cycle. Since the time duration between the pulses $t'_1$ and $t'_2$ is a small portion of a cycle, that is, the time interval between two successively transmitted acoustic pulses $T_0$, an extraneous pulse, for example, one caused by scraping noise in the borehole, triggering the scale-of-two circuit also will not adversely affect the circuit to any great extent since the scale-of-two resetting circuit 184 will generally have time to operate to properly set the scale-of-two circuit 174 for the next cycle of operation.

Although only the electric pulses $t_1$ and $t_2$ need be transmitted to the earth's surface to measure subsurface formation velocities, it has been found very desirable, particularly from the standpoint of interpreting the acoustic velocity logs, to transmit to the earth's surface the electric pulse $t_0$. By detecting the electric pulse $t_0$ on the oscilloscope 141, the logging operator may monitor the times with respect to the electric pulse $t_0$ at which the electric pulses $t_1$ and $t_2$ are received. This information is useful in detecting and recognizing, for example, acoustic noise and acoustic attenuation. If desired the relationship of the three pulses $t_0$, $t_1$ and $t_2$ may be recorded by substituting a suitable recorder for the oscilloscope 141.

Accordingly, it can be seen that an improved acoustical velocity logging system has been provided which produces high quality acoustical velocity logs with the use of a transmission circuit which utilizes only one conductor to convey all electric energy between the surface equipment and the borehole or exploring unit. The system transmits up the borehole the information desired from each of a plurality of transducers and, more particularly, from a transmitting transducer and a plurality of receiving transducers over a single conductor cable or transmission line while supplying the necessary operating energy from the earth's surface to the exploring unit through the same single conductor cable or transmission line. The system of this invention provides an exploring unit which is relatively light in weight yet supplies very accurate acoustic velocity logging information to the earth's surface where it is converted into a form which can be readily recorded and studied.

It should be noted in particular that when the borehole diameter is very large, such as in a washed out or caved in area, or when the formation velocity is very low, the first acoustic energy received at the first receiving transducer is the energy passing through the borehole fluid or the acoustic assembly, causing an inaccurate velocity measurement. This inaccurate velocity measurement can be readily detected when the acoustical velocity logging system of the present invention is being used.

Obviously, many modifications and variations of the invention as hereinabove set forth, may be made without departing from the spirit and scope thereof, and therefore, only such limitations should be imposed as are indicated in the appended claims.

We claim:

1. An acoustical velocity well logging system comprising an elongated tool adapted to be passed through the bore of a well, said tool having first, second and third transducers positioned in fixed spaced apart relationship in said tool, means for transmitting acoustic pulses at predetermined time intervals through a subsurface formation opposite said transducers, means for producing a first electric pulse at the occurrence of a given one of said acoustic pulses at said first transducer, means for producing a second electric pulse upon the arrival of said given acoustic pulse at said second transducer, means for producing a third electric pulse upon the arrival of said given acoustic pulse at said third transducer, means defining a single electrical channel for transmitting said first, second and third electric pulses through the bore of the well, means coupled to the means defining said channel at a remote point from said tool for indicating said first, second and third pulses, means coupled to the means defining said channel at a remote point from said tool for deleting one of said first, second and third electric pulses and a time measuring circuit coupled to the means defining said channel at a remote point from said tool for measuring the time interval between the remaining two pulses of said first, second and third pulses.

2. An acoustical velocity well logging system comprising an elongated tool adapted to be passed through the bore of a well, said tool having a transmitting transducer and first and second receiving transducers positioned in fixed spaced apart relationship in said tool, means for producing a first electric pulse for actuating said transmitting transducer to produce an acoustic pulse for passage through a subsurface formation from said transmitting transducer to said first receiving transducer and to said second receiving transducer, means for producing a second electric pulse upon the arrival of said acoustic pulse at said first receiving transducer, means for producing a third electric pulse on the arrival of said acoustic pulse at said second receiving transducer, a single conductor cable, means for applying said first, second and third electric pulses to one end of said single conductor cable, means coupled to the opposite end of said single conductor cable for indicating said first, second and third pulses, means coupled to said opposite end of said cable for deleting said first electric pulse, said pulse deleting means including an output, and a time measuring circuit coupled to the output of said first pulse deleting means for measuring the time interval between said second and third electric pulses.

3. An acoustical velocity well logging system comprising an elongated tool adapted to be passed through a bore of a well, said tool having a transmitting transducer and first and second receiving transducers, said transducers being positioned longitudinally in fixed spaced apart relationship in said tool, means for producing a first electric pulse for actuating said transmitting transducer to produce an acoustic pulse for passage through a subsurface formation between said first and second receiving transducers, means for collecting electric pulses, means for applying said first electric pulse to said pulse collecting means, means for producing a second electric pulse upon the arrival of said acoustic pulse at said first receiving transducer, means for applying said second electric pulse to said pulse collecting means, means for producing a third electric pulse upon the arrival of said acoustic pulse at said second receiving transducer, means for applying said third electric pulse to said pulse collecting means, a single transmission line, means responsive to said first, second and third electric pulses for producing high-power, short-duration electric pulses, means for applying said high-power, short duration pulses to one end of said single line for transmission therethrough, indicating means coupled to the opposite end of said single transmission line and responsive to at least said first electric pulse, means coupled to said opposite end of said single transmission line for deleting said first pulse and passing said second and third pulses, said first pulse deletion means including an output, and a time measuring circuit disposed at a remote point from said elongated tool and connected to the output of said first pulse deletion means for measuring the time interval between said second and third electric pulses.

4. An acoustical velocity well logging system comprising an elongated tool adapted to be passed through the bore of a well, said tool having an acoustical transmitting transducer and first and second receiving transducers, said transducers being positioned longitudinally in fixed spaced apart relationship in said tool, means for producing a first electric pulse to actuate said transmitting transducer to produce an acoustic pulse for passage through a subsurface formation between said first and second receiving transducers, a pulse collecting circuit including a dual cathode follower having first and second control grids, means including a first blocking diode for applying said first electric pulse to the first control grid of said dual cathode follower, means for producing a second electric pulse upon the arrival of said acoustic pulse at said first receiving transducer, a first normally inoperable trigger circuit including a gas tube having two control grids, means for applying said second electric pulse to one of the two control grids of said gas tube, means comprising a first gate generator for applying a gate pulse to the second of said two control grids of said gas tube during at least a time interval when said second electric pulse is expected to be produced, means for coupling the output of said first trigger generator to the second control grid of said dual cathode follower, means for producing a third electric pulse upon the arrival of said acoustic pulse at said second receiving transducer, a second normally inoperable trigger generator including a second gas tube having two control grids, means for applying said third electric pulse to one of the two control grids of said second gas tube, means comprising a second gate generator for applying a gate pulse to the second of said two control grids of said second gas tube during at least a time interval when said third electric pulse is expected to be produced, means including a second blocking diode coupling the output of said second trigger generator to the first control grid of the dual cathode follower, a single conductor cable, a cable pulsing circuit responsive to each of said first, second and third electric pulses, said cable pulsing circuit including a pulse forming network and a hydrogen thyratron having a cathode and anode and a control grid, said anode being connected to said pulse forming network, said control grid being coupled to the output of said pulse collecting circuit and said cathode being coupled to one end of said single conductor cable, means comprising a first-pulse deletion circuit having an input and an output, the input of said first pulse deletion circuit being coupled to the other end of said single conductor cable, said first pulse deletion circuit means comprising a diode normally shunting said first pulse away from said output and a one-shot multivibrator responsive to said first pulse and coupled to said diode for blocking the bypass of said second and third electric pulses thereby to produce at the output of said first pulse deletion circuit said second and third electric pulses, a time measuring device including a scale-of-two circuit coupled to the output of said first pulse deletion circuit and responsive to said second and third electric pulses and a scale-of-two resetting circuit including a thyratron circuit having a control grid and a trigger voltage of a given value and means coupled to an output of said scale-of-two circuit for producing a varying voltage at the control grid of said thyratron circuit, said varying voltage producing means being adapted to produce a voltage of said given value at a time after the interval of time during which the third electric pulse is expected to be produced, the output of said thyratron circuit being applied to the input of said scale-of-two circuit.

5. A system for determining an acoustical velocity through a subsurface formation traversed by a borehole comprising means including a first electric pulse producing means for transmitting an acoustic pulse through a subsurface formation between first and second spaced apart points in the borehole, means for producing second and third electric pulses upon the arrival of said acoustic pulse at said first and second points, respectively, a single transmission line, means for applying said first, second and third electric pulses to one end of said single transmission line, means coupled to the other end of said transmission line for indicating at least said first pulse and one of said second and third pulses, means coupled to said other end of said transmission line for deleting said first pulse and producing said second and third pulses at the output thereof, said pulse deleting means including an output, and means coupled to the output of said first pulse deleting means for measuring the time interval between said second and third electric pulses.

6. An acoustical velocity well logging system comprising an elongated tool adapted to be passed through the bore of a well, said tool having an acoustical transmitting transducer and first and second receiving transducers, means for producing a first electric pulse to actuate said transmitting transducer to produce an acoustic pulse for passage through a subsurface formation opposite said transducers, means for producing a second electric pulse upon the arrival of said acoustic pulse at said first receiving transducer, means for producing a third electric pulse upon the arrival of said acoustic pulse at said second receiving transducer, a single conductor cable, means for applying said first, second and third electric pulses to one end of said single conductor cable, means coupled to the opposite end of said single conductor cable for indicating said first, second and third pulses, means coupled to said opposite end of said single conductor cable for deleting said first pulse, said first pulse deleting means comprising a gated signal circuit normally inoperative for transmitting a pulse signal and gate control means operatively coupled to said normally inoperative gated signal circuit and responsive to the arrival of said first electric pulse for generating a control signal for actuating said gated signal circuit for a predetermined time interval after the arrival of said first electric pulse and during the expected time of arrival of said second and third electric pulses, said first pulse deleting means including a pulse output circuit and means coupled to the output of said first pulse deleting means for measuring the time interval between said second and third electrical pulses.

7. An acoustical velocity well logging system as set forth in claim 6 wherein the gate control means of said pulse deleting means further includes a multivibrator responsive to said first pulse and wherein said normally inoperative gated signal circuit includes a pulse shunt circuit which is normally in a low impedance condition and is placed in a high impedance condition by said multivibrator after the application thereto of said first pulse.

8. An acoustical velocity well logging system comprising an elongated tool adapted to be passed through the bore of a well, said tool having an acoustical transmitting transducer and first and second receiving transducers, said transducers being positioned longitudinally in fixed spaced apart relationship in said tool, means for producing a first electric pulse to actuate said transmitting transducer to produce an acoustic pulse for passage through a subsurface formation opposite said transducers, means for producing a second electric pulse upon the arrival of an acoustical pulse at said first receiving transducer, means for producing a third electric pulse upon the arrival of said acoustic pulse at said second receiving transducer, a single transmission line, means for applying said first, second and third electric pulses to one end of said single transmission line, indicating means coupled to the opposite end of said single transmission line responsive to said electric pulses, means coupled to the opposite end of said single transmission line for deleting said first pulse, said first pulse deleting means having an output, said first pulse deleting means including switching means normally operative for shunting said first electric pulse away from the output of said first pulse deleting means and means for rendering said switching means inoperative for shunting said second and third electric pulses from the output of said first pulse deleting means, and means coupled to the output of said first pulse deleting means for measuring the time interval between said second and third electric pulses.

9. An acoustical velocity well logging system comprising an exploring unit adapted to be passed through the bore of a well, said unit having an acoustical transmitting transducer and first and second receiving transducers, said transducers being positioned longitudinally in fixed spaced apart relationship in said unit, means for producing a first electric pulse to actuate said transmitting transducer to produce an acoustic pulse for passage through a subsurface formation from said transmitting transducer to said first receiving transducer and to said second receiving transducer, means for producing a second electric pulse upon the arrival of said acoustic pulse at said first receiving transducer, means for producing a third electric pulse upon the arrival of said acoustic pulse at said second receiving transducer, means defining a single electrical channel, means for applying said first, second and third electric pulses to one end of the means defining said single electrical channel, indicating means coupled to the opposite end of said channel responsive to said electric pulses, means coupled to said opposite end of the means defining said single electric channel for deleting said first pulse, said first pulse deleting means including an output circuit, said first pulse deleting means including a multi-vibrator responsive to said first pulse, said multi-vibrator having time constants such that a voltage is produced thereby in response to said first pulse having a time duration including the time of occurrence of both said second and third electric pulses, means for shunting said first pulse from said output circuit of said first pulse deleting means comprising a diode connected in parallel with said multivibrator, the cathode of said diode being connected to the output of said multi-vibrator and the anode of said diode being coupled to said output of said first pulse deleting means, and means coupled to the output circuit of said first pulse deleting means for measuring the time interval between said second and third electric pulses.

10. A system as defined in claim 8 wherein said switching means comprises a diode and said means for rendering said switching means inoperative comprises a multivibrator having an output coupled to said diode, said multivibrator being responsive to said first electric pulse for applying a voltage to said diode, the time constants of said multivibrator being such that the voltage applied to said diode from said multivibrator output renders said diode inoperative to shunt said second and third electric pulses.

References Cited in the file of this patent
UNITED STATES PATENTS

| | | |
|---|---|---|
| 2,651,027 | Vogel | Sept. 1, 1953 |
| 2,857,011 | Summers | Oct. 21, 1958 |

UNITED STATES PATENT OFFICE

CERTIFICATE OF CORRECTION

Patent No. 3,071,203
January 1, 1963

Kerry D. Savage et al.

It is hereby certified that error appears in the above numbered patent requiring correction and that the said Letters Patent should read as corrected below.

Column 1, line 55, for "I" read -- In --; column 3, line 72, for "conducted" read -- connected --; column 7, line 75, for "timed" read -- time --.

Signed and sealed this 16th day of July 1963.

(SEAL)
Attest:

ERNEST W. SWIDER
Attesting Officer

DAVID L. LADD
Commissioner of Patents